United States Patent [19]

Goldowsky

[11] Patent Number: 4,675,563
[45] Date of Patent: Jun. 23, 1987

[54] RECIPROCATING LINEAR MOTOR

[75] Inventor: Michael P. Goldowsky, Valhalla, N.Y.

[73] Assignee: The United States of America as represented by the Administrator of the National Aeronautics & Space Administration, Washington, D.C.

[21] Appl. No.: 809,851

[22] Filed: Dec. 17, 1985

Related U.S. Application Data

[63] Continuation of Ser. No. 437,914, Oct. 29, 1982, abandoned.

[51] Int. Cl.[4] .............................................. H02K 33/00
[52] U.S. Cl. ..................................... 310/15; 290/1 R; 310/30
[58] Field of Search ...................... 310/15, 24, 36, 27; 290/1

[56] References Cited

U.S. PATENT DOCUMENTS

| 3,102,205 | 8/1963 | Combs | 310/15 X |
|---|---|---|---|
| 3,504,320 | 3/1970 | Engdahl | 310/15 X |
| 4,346,318 | 8/1982 | Strikman | 310/30 X |
| 4,389,849 | 6/1983 | Gasser et al. | 310/15 X |
| 4,454,426 | 6/1984 | Benson | 310/15 X |
| 4,602,174 | 7/1986 | Redlich | 310/15 |
| 4,623,808 | 11/1986 | Beale et al. | 310/15 |

Primary Examiner—Donovan F. Duggan
Attorney, Agent, or Firm—John O. Tresansky; John R. Manning; Sol Sheinbein

[57] ABSTRACT

A reciprocating linear motor (10) is formed with a pair of ring-shaped permanent magnets (50, 52) having opposite radial polarizations, held axially apart by a non-magnetic yoke (20), which serves as an axially displaceable armature assembly (14). A pair of annularly wound coils (30, 32) having axial lengths which differ from the axial lengths of the permanent magnets are serially coupled together in mutual opposition and positioned with an outer cylindrical core (24) in axial symmetry about the armature assembly. One embodiment includes a second pair of annularly wound coils (36, 38) serially coupled together in mutual opposition and an inner cylindrical core (26) positioned in axial symmetry inside the armature radially opposite to the first pair of coils. Application of a potential difference across a serial connection of the two pairs of coils creates a current flow perpendicular to the magnetic field created by the armature magnets, thereby causing limited linear displacement of the magnets relative to the coils.

14 Claims, 5 Drawing Figures

RECIPROCATING LINEAR MOTOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

This application is a continuation of application Ser. No. 437,914, filed 10/29/82, now abandoned.

TECHNICAL FIELD

This invention generally relates to linear electromagnetic machines and, more particularly, to reciprocating linear motors.

BACKGROUND ART

A linear motor is an electromagnetic machine in which electrical current through a coil winding carried by one part of a motor interacts with a magnetic flux emanating from another part of the motor to create a relatively high level of force between the two motor parts in a direction normal to the coil current and magnetic flux. The two parts of the motor are arranged to allow the occurrence of a limited linear displacement between the parts in reaction to the force created. Reciprocation between the parts may be obtained by periodically reversing the direction of current flow through the coil. The force of displacement created between the two parts of the motor may be harnessed by holding one of the parts stationary and connecting the other part to pulse the cone of a loud speaker, for example, or to drive the piston of a vibrator.

The amount of work obtainable from a reciprocating linear motor is proportional to three variables: namely the amplitude of the displacement force created between the moving and stationary parts, the length or "stroke" of the linear displacement between the parts, and the frequency with which linear displacement occurs. The work obtainable may be maximized, therefore, by maintaining a large force between the moving and stationary parts during each stroke, by designing the moving part to traverse the longest possible distance during each stroke, and by operating the motor to cause the strokes to occur with the greatest frequency. Particular design considerations may restrict one of these variables. An effort to miniaturize a motor, for example, may require shortening of its stroke, thereby necessitating operation of the motor at a higher frequency to provide the same amount of work. Other considerations may necessitate a motor able to perform variable amounts of work by operating over a wide band of frequencies.

Previous efforts to maximize the work obtainable from reciprocating linear motors have included proposals of elaborate electrical networks for increasing the displacement force between the movable and stationary parts by controlling the instantaneous current flow through the coil winding. Such networks, which usually involve various arrangements of coils and taps, are complex and are prone to failure due to the sheer number of component parts.

Maximization of obtainable work is not the only consideration influencing the design of a linear motor. Smooth and efficient operation mandates that the displacement force created between the motor parts be nearly linearly proportional to the instantaneous coil current throughout the length of each stroke. The ratio of the displacement force to coil current is a term called the "force constant." A motor exhibiting a displacement force that varies linearly with coil current will have an unvarying force constant over the length of a stroke. This characteristic is not exhibited by previously proposed linear motors where coil windings have axial lengths equal to the axial lengths of the sources of magnetic flux. They are also lacking in the symmetry advantage inherent in having two magnet rings.

Other previous proposals have attempted to provide smooth and efficient linear motor operation while maximizing the work attainable by improving various mechanical characteristics of a motor. One proposal sought to provide a reciprocating linear motor in which the force exerted on the moving part remained constant throughout substantially the entire length of its stroke by using a single, radially polarized ring magnet which serves as the moving part (i.e., the "armature") of the motor. Pairs of taps simultaneously sliding along an outer coil wound inside a U-shaped, cylindrical stator core follow the armature travel. The sliding taps control the distribution of current through the outer coil and through an inner coil wound around a stationary inner core joined by a central end section to the outer core and keeps the equal current flowing through the coil sections on either side of the armature. This configuration of pairs of sliding taps and outer and inner coils fails to provide a linear motor having an unvarying force constant, over the length of a stroke, thereby creating a unidirectional restoring force along the longitudinal motor axis which has an amplitude dependent upon the location of the armature magnet. This restoring force acts as a bias opposing displacement of the armature away from the central core section. Additionally, the continuous sliding action of the taps presents a source of wear likely to cause early failure of the motor. Moreover, the use of a single ring magnet in the armature presents a source of radial instability due to such influences as magnetic attraction between the magnet and the cores as well as an intrinsic axial bias force if the current is not distributed through the coils with precise equality on both sides of the armature.

STATEMENT OF INVENTION

Accordingly, it is one object of the present invention to provide an improved reciprocating linear motor.

It is another object to provide a structurally simple reciprocating linear motor.

It is still another object to provide a reciprocating linear motor free of intrinsic axial bias forces.

It is a further object to provide a reciprocating linear motor that is minimally unstable radially.

It is a still further object to provide a reciprocating linear motor that may be efficiently operated over a wide bandwidth.

It is an additional object to provide a reciprocating linear motor generating a displacement force linearly proportional to applied current over the length of a stroke.

It is an additional object to provide a reciprocating linear motor susceptible to operation with a simple control network.

These and other objects are achieved by an axially symmetric, reciprocating linear motor having an armature formed by a pair of radially polarized ring magnets of opposite polarization coaxially separated by a fixed distance. An outer ferromagnetic core is radially separated by large air gaps from the magnet rings and a pair of annularly wound and serially coupled coils having axial lengths differing from the magnet rings are coaxially positioned in the air gaps adjacent to the outer core.

The displacement force applied to the armature of the motor remains linearly proportional to the current flowing through the coils over a stroke length equal to the difference between the axial lengths of the magnet rings and the coils. The axially symmetric arrangement of the core, coils and magnet rings avoids bias forces while the width of the air gaps attenuates the forces of magnetic attraction between the magnet rings and the core.

BRIEF DESCRIPTION OF THE DRAWINGS

A more complete appreciation of this invention and many of the attendant advantages thereof will be readily apparent as the same becomes better understood by reference to the following detailed description when considered in conjunction with the accompanying drawings in which like numbers indicate the same or similar components, wherein.

DETAILED DESCRIPTION OF THE INVENTION

Figure 1:
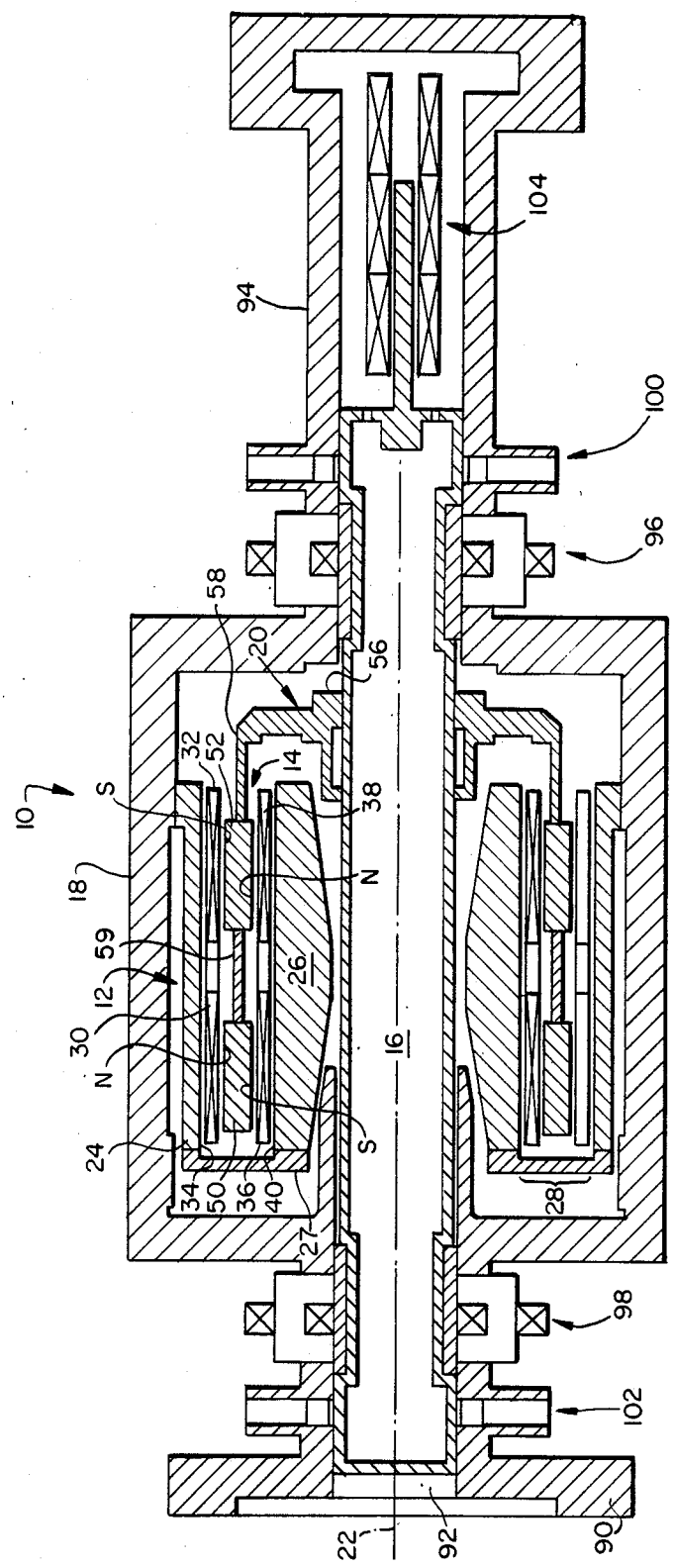
FIG. 1 is a front sectional view showing the details of one embodiment of the invention.

Refer now to the drawings and, in particular, to FIG. 1 which illustrates an axially symmetric reciprocating linear motor 10 according to this invention. The motor is formed by a stationary assembly 12 and a reciprocating armature assembly 14 coaxially positioned around a central shaft 16 disposed inside a cylindrical housing 18. The housing serves as a rigid frame supporting the stationary assembly. One end of the armature assembly 14 is joined to the shaft 16 by a yoke 20. In operation, electromagnetic interaction between the stationary and armature assemblies gives rise to a force directed along the longitudinal axis 22 of the motor that causes a limited axial displacement of the armature assembly 14 and shaft 16 relative to stationary assembly 12 and housing 18. If the housing 18 is stationary, the axial displacement will be confined to linear movement of the armature assembly and may be used to perform work.

The stationary assembly 12 includes an outer core 24 and an inner core 26, both of which are formed of a ferromagnetic material. The cores are held coaxially aligned and centered upon axis 22 by a connecting plate 27 of a non-ferromagnetic material attached to one end of each core. Radial separation between cores 24, 26 provides a relatively large cylindrical air gap 28 of uniform axial width. The stationary assembly also includes an outer pair of annularly wound coils 30, 32 positioned within air gap 28 against the interior circumferential surface 34 of the outer core 24. The axial length, diameter, number of turns and wire gauge of coils 30, 32 are identical. Coils 30 and 32 are coupled together in series opposition. An inner pair of annularly wound coils 36, 38 are also positioned within air gaps 28. The inner pair of coils, also coupled together in series opposition, are radially separated from the outer pair and are set against the exterior circumferential surface 40 of the inner core 26. Coils 36 and 38 also have identical lengths, diameter, numbers of turns, and wire gauges. The outer and inner pairs of coils are serially connected together with concentrically aligned pairs of coils 30 and 36 and 32 and 38, respectively, in series aiding relation. Application of a potential difference across serially connected coils 30, 32, 36 and 38, therefore, will cause an electrical current to flow in one direction through coils 30 and 36 and in the opposite direction through coils 32 and 38.

The armature assembly 14 includes a pair of ring-shaped permanent magnets 50, 52 of equal diameter and axial length held by yoke 20 within air gap 28 and spaced apart from the inner circumference of the outer pair of coils 30, 32 and the outer circumference of the inner pair of coils 36, 38.

The ring magnets have opposite radial polarization. Magnet 50 has its north pole, N on its outer circumferential surface opposite the inner surface of coil 30 and its south pole, S, on its inner circumferential surface opposite the outer surface of coil 36 while magnet 52 has its north pole, N, on its inner circumferential surface opposite the outer surface of coil 38 and its south pole, S, on its outer circumferential surface opposite the inner surface of coil 32. Yoke 20 has a hub 56 attached to the circumference of shaft 16, which extends radially outward around the ends of the inner core 26 and one of the inner coils 38 of the stationary assembly. A cylindrical outer flange 58 of yoke 20 connects one end of magnet 52 with the hub. An intermediate flange section 59 of yoke 20 holds magnets 50, 52 in fixed axial separation. Yoke 20 is made of a non-magnetic material to magnetically isolate the ring magnets from each other.

Figure 2:
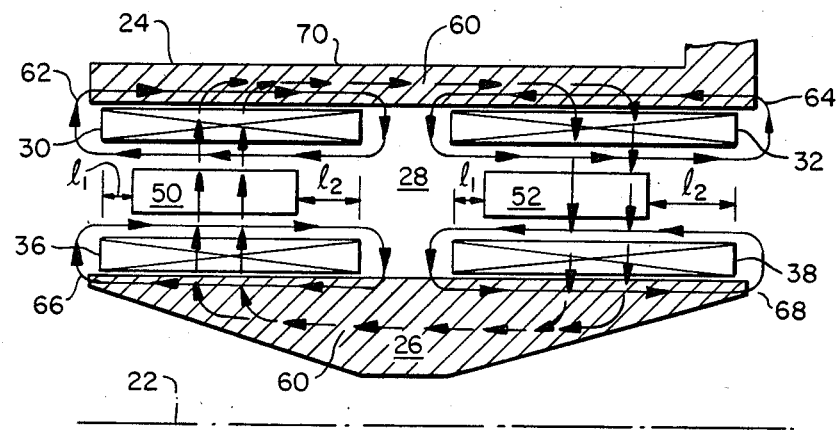
FIG. 2 is a partial front sectional view showing the electro-magnetic elements of the embodiment of FIG. 1.

FIG. 2 illustrates with dashed arrowheads a permanent magnetic flux path 60 followed by the lines of magnetic flux flowing between magnets 50, 52. The path of the flux is shown in a clockwise direction extending radially outward from the north pole of magnet 50, radially across air gap 28 and through coil 30; axially through core 24; radially inward through coil 32, air gap 28, to the south pole of magnet 52. The path further extends from the north pole of magnet 52, across air gap 28, through coil 38; axially through core 26; and radially outward through coil 36 and across air gap 28 to the south pole of magnet 50. The path 60 of the permanent magnetic flux is perpendicular to the windings of coils 30, 32, 36 and 38. Application of a potential difference across these serially connected coils will cause a flow of direct current in opposite directions around concentric pairs of coils 30, 36 and 32, 38, perpendicularly to the flux path 60 created by permanent magnets 50, 52. The magnetic flux provided by permanent magnets 50, 52 interacts with a flow of current through the coils to create cross product forces parallel to the longitudinal axis 22. At any particular instant, the cross product forces produced by interaction of the magnetic flux of permanent magnets 50, 52 with the current flowing through both pairs of concentric coils are unidirectional along axis 22 because both the current and magnetic flux flow in opposite directions in the pairs of concentric coils. Consequently, the cross product forces vectorially add to generate a net axial force between stationary assembly 12 and armature assembly 14 which, if the stationary assembly 12 is held immovable, will cause the armature assembly and shaft 16 to be axially displaced toward the right in FIGS. 1 and 2.

FIGS. 1 and 2 show the axial lengths of each of the ring magnets 50, 52 differ from the axial lengths of coils 30, 32, 36 and 38. The difference between these lengths is detiled in FIG. 2 where the axial length of each coil exceeds the axial length of each magnet by at least the sum of axial distances $l_1$ and $l_2$. Over an axial stroke along the distance represented by the sum of $l_1$ and $l_2$, the radial components of the fields of magnets 50, 52 pass normally through constant axial length sections of coils 30, 36 and 32, 38, respectively, thereby intersecting a constant number of coil turns regardless of the position of the armature magnets. Therefore, in the cross product equation, $$\vec{F} = ni\vec{L} \times \vec{B}, \quad (1)$$

the value of n, which is the number of coil turns crossed by the magnetic fields of magnets 50, 52, remains constant as the armature assembly transverses a stroke having an axial length equal to the difference between the lengths of the coils and the permanent magnets. The value of the radial components of the permanent magnetic flux, $\vec{B}$, flowing across the coils remains constant on the average due to the axial and radial symmetry between the stationary and armature parts of the motor. L, the length of each coil turn, is a design parameter, having a constant value. The current flowing through the coils, i, is the only operational variable expressed in equation (1). The value of the net axial displacement force, $\vec{F}$, varies linearly, therefore, with the amplitude of the current flowing through the coils.

It may be noted that during each stroke, the location of the permanent magnetic flux path 60 shifts axially along the lengths of cores 24, 26 due to axial displacement of magnets 50, 52. The fixed separation between magnets 50, 52, however, assures that the length of flux path 60 remains constant throughout the course of a stroke, independently of magnet location. The reluctance of flux path 60, therefore, remains constant over the course of a stroke, and does not effect the linearity between the displacement force and the coil current. The force constant of motor 10, a value determined by the ratio of the displacement force to coil current, is constant and independent of armature location. It may also be noted that construction of a motor having coils only in its stationary assembly eliminates any need for flexible electrical leads to the armature assembly, a feature which eliminates one persistent source of failure in previously available reciprocating linear motors.

Current flowing through coils 30, 32, 36 and 38 during axial movement of magnets 50, 52 will cause some parasitic magnetic fields along flux paths 62, 64, 66 and 68, shown with solid arrowhead lines around each of the coils and through the corresponding adjacent sections of ferromagnetic cores 24 and 26. The directions of the parasitic flux caused by concentric pairs of coils 30, 36 are the same and are opposite to those of the parasitic flux caused by concentric coil pairs 32, 38. In the scenario, shown in FIG. 2, the parasitic flux of coils 30, 36 flows in the same direction as the permanent magnetic flux where flux paths 60, 62 and 66 overlap, while the parasitic flux of coils 30, 36 flows in the same direction as the permanent magnetic flux where flux paths 60, 64 and 68 overlap. Consequently, parasitic flux created by coils 30, 36 will increase the magnitude of the radial component of permanent magnetic flux passing through coils 30, 36 while parasitic flux created by coils 32, 38 will decrease the magnitude of the radial component of permanent magnetic flux passing through coils 32, 38 in an amount equal to the magnitude of the increase caused by coils 30, 36. Consequently, the magnetic flux in the central sections 70, 72 of ferromagnetic cores 24, 26 respectively, will remain constant. The parasitic magnetic flux created by the two concentric coil pairs, therefore, will have no effect upon the linear relation between the net axial force generated by the motor and the current flowing through its coils.

The amount of work obtainable from the reciprocating linear motor disclosed is partially dependent upon the frequency with which the armature assembly is displaced relative to the stationary assembly and partially dependent upon the length of each displacement. The greatest amount of work may be obtained at the resonant frequency of motor 10 because at resonance the length of armature displacement is significantly longer than at any other frequency. The resonant frequency of motor 10 is proportional to the reciprocal of the square root of the mass of its armature assembly 20. A low armature assembly mass, therefore, provides a higher resonant frequency for motor 10 with a given size resonating spring.

Motor 10 will also operate at frequencies other than at resonance. The range of frequencies over which a linear motor is considered to operate efficiently is known as its bandwidth and extends from zero Hertz to the frequency beyond resonance at which its armature assembly's displacement equals its displacement at zero Hertz. The armature assembly displacement at zero Hertz is inversely proportional to the reciprocal of the armature assembly's mass. The mass of the armature assembly 14 is minimal, including only a pair of ring-shaped permanent magnets and a connecting yoke. This minimal armature assembly mass allows motor 10 to have a wide bandwidth and a high resonant frequency. The high value of its resonant frequency in turn allows motor 10 to provide a greater amount of work when operated at its resonant frequency. Additionally, the symmetry of the stationary assembly about its longitudinal axis assures that variations in the flux path length during operation do not cause axial bias forces opposing displacement of the armature assembly. Moreover, the location of the coil windings between the stationary assembly cores and armature magnets intrinsically creates relatively wide air gaps, thereby causing substantial attenuation of forces of magnetic attraction between the core and magnets which would otherwise make the motor much more radially unstable. It is apparent, therefore, that the construction of an armature assembly formed by a pair of spaced apart, ring-shaped magnets provides a structurally simple motor capable of operating over a wide band of frequencies and of providing more work than currently available motors when operated at its resonant frequency.

Figure 3:
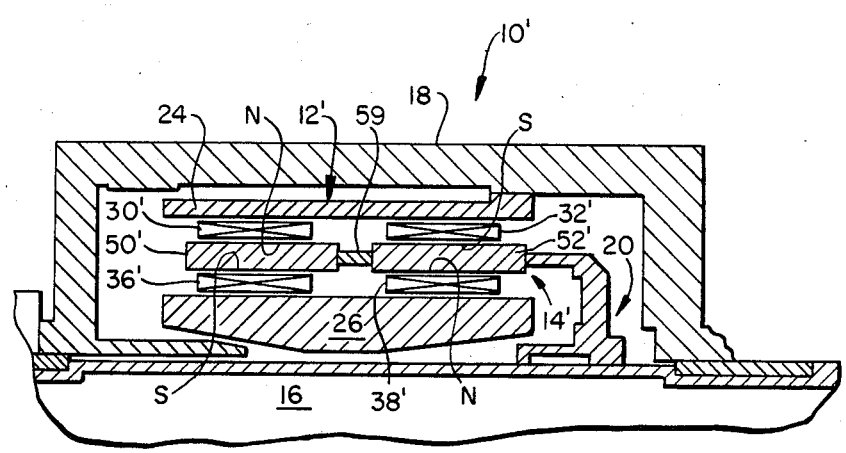
FIG. 3 is a partial front sectional view showing the details of an alternative embodiment.

Various features of motor 10 may be modified. FIG. 3 illustrates an alternative embodiment of motor 10' in which a stationary assembly 12' is constructed with annular coils 30', 32', 36' and 38' having axial lengths less than the axial lengths of ring magnets 50', 52' of armature assembly 14. These differences in axial lengths assure that the force constant of motor 10' is unvarying over a stroke length not greater than the differences in axial length.

Figure 4:
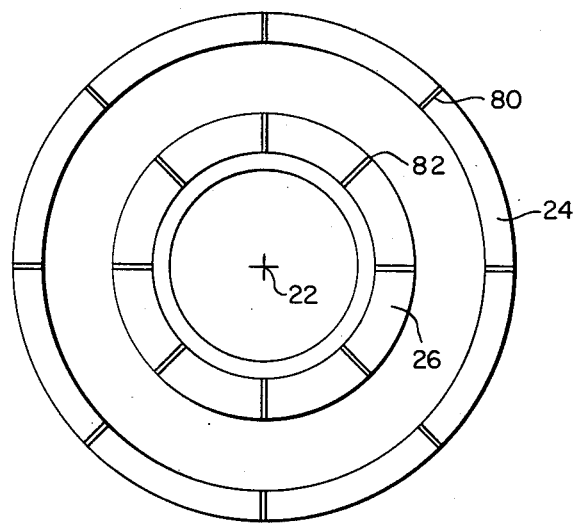
FIG. 4 is an end view of the core members of one embodiment.

Other modifications may be made in the structure of a linear motor without departing from the principles of the present invention. For example, as shown in FIG. 4, the ends of both the outer-core 24 and the inner core 26 of the stationary assembly may be cut by a plurality of radial slots 80, 82, respectively. These slots extend from opposite ends of cors 24, 26 toward their center sections. The center sections of both cores 24, 26 are solid, thereby serving to hold the opposite slotted end sections together. During operation of motor 10, the armature magnets will travel between the slotted end sections of the cores. Consequently, the permanent magnetic flux will transverse flux path 60 parallel to the radial slots 80, 82 while formation of eddy currents which tend to flow normal to lines of magnetic flux reaction to axial movement of armature magnets 50, 52, will be hindered by the existence of the radial slots. No eddy currents will be formed in the solid center sections of the magnetic cores because the magnetic flux remains constant there.

Figure 5:
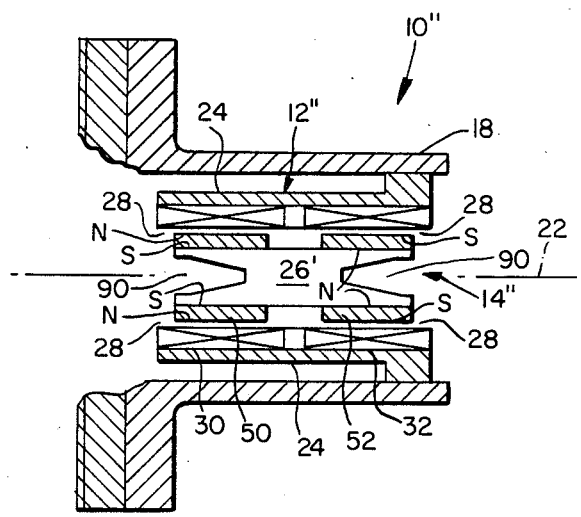
FIG. 5 is a partial front sectional view showing the stationary and armature assemblies of an alternative embodiment.

FIG. 5 illustrates a reciprocating motor 10" incorporating other modifications. In this embodiment, the stationary assembly 12" is constructed with a single pair of coaxial, equidiametric coils 30,32 rather than two pairs of concentric coils. The coils 30, 32 are annularly wound around the inside circumferential surface of outer ferromagnetic core 24 and are serially connected in mutual opposition. The armature assembly 14" includes ring-shaped magnets 50, 52 having axial lengths which differ from the axial lengths of coils 30, 32. The armature magnets are mounted directly upon the exterior circumferential surface of an inner core 26' of a ferromagnetic material and have a fixed, axial separation from each other. Inner core 26' contains a conic recess 90 in both of its base surfaces to minimize the mass of the core assembly, thereby assuring that motor 10" will have a high resonant frequency.

Armature magnets 50, 52 create a magnetic flux path (not shown) which is shown flowing clockwise from the north pole, N, at the exterior circumferential surface of magnet 50, radially outward across air gap 28 and perpendicularly through the windings of coil 30, axially through outer core 24, radially inward and perpendicularly through the windings of coil 32 and across air gap 28 to the south pole, S, at the exterior circumferential surface of armature magnet 52. The magnetic flux flows predominately axially through armature core 26' between the north pole, N, at the inner circumferential surface of armature magnet 52 and the south pole, S, at the inner circumferential surface of armature magnet 50.

When a potential difference is applied across serially connected coils 30, 32, electrical current will flow in opposite direction around coils 30, 32, perpendicularly to the flux interacts with the coil current flow to create a unidirectional cross product force along the longitudinal axis 22 of motor 10" which will cause armature assembly 14 to be axially displaced relative to stationary assembly 12".

Shaft 16 and housing 18 of motor 10 may be complementarily constructed to allow the motor to provide a single expansion, Stirling cycle cryogenic refrigerator of the type disclosed in copending application, U.S. Ser. No. 06/308,204, now U.S. Pat. No. 4,389,849, entitled "Stirling Cycle Cyrogenic Cooler" which patent is incorporated herein by reference. In that application, housing 18 and flange 91 form a variable volume compression space 92. Shaft 16 serves as a piston driven by the displacement forces created between the armature and stationary assemblies to linearly reciprocate within an elongated, cylinder formed by motor housing 18 and sleeve 94. Shaft 16 may be held in magnetic suspension within this cylinder by a pair of mutually separated active magnetic assemblies 96, 98, each having four orthogonally positioned electromagnets. The magnetic bearing assemblies are selectively energized by electrical power selectively supplied under regulation of adjacently located radial position sensor assemblies 100, 102, each of which is made with at least two, but preferably four orthogonally mounted sensor probes for sensing any radial movement of shaft 16. The details of this type of magnetic bearing and position sensor are disclosed in greater detail in copending application, U.S. Ser. No. 06/220,213, now U.S. Pat. No. 4,473,259, entitled "Linear Magnetic Bearings" which application is incorporated herein by reference. The end of shaft 16 opposite compression volume 92 is coupled to a linear position sensor 104 of the type made from linear variable differential transformers adapted to provide electrical control signals in response to the axial position (movement) of shaft 16 within sleeve 94. Shaft 16 is driven in response to the sensed control signals of position sensor 104 whereupon the armature assembly 14 and shaft 16 are made to reciprocate substantially sinusoidally in a proper sequence for approximating an ideal Stirling cycle operation in the manner described in the earlier mentioned U.S. Pat. No. 4,389,849.

I claim:

1. A linear electromagnetic machine comprising:
   a housing having an axially reciprocable shaft positioned therein,
   an armature assembly secured to said shaft and having a plurality of fixed axial spaced ring shaped permanent magnets of opposite radial polarization for producing an external magnetic field with radial components of opposite directions,
   a stationary assembly secured to said housing having at least one core member formed of a ferromagnetic material positioned in axial symmetry with and in radial separation from said ring shaped permanent magnets for providing an axial flux path for said magnetic field between its radial components,
   at least a single plurality of axially spaced coils positioned between said stationary assembly and said ring shaped permanent magnets which maintain a stationary relation with said core member of said stationary assembly and radial and axial symmetry with a particular one of said permanent magnets, said coils being electrically connected to conduct current in opposite directions whereby the interaction between the electric current flowing in one of said plurality of coils and the radial component of the magnetic field produced by the respectively symmetrical one of said plurality of permanent magnets creates cross product forces parallel to the axis which generate a net axial force varying linearly with the amplitude of said flowing current to axially displace said armature assembly and said shaft.

2. A linear electromagnetic machine of claim 1 wherein each of said plurality of ring shaped permanent magnets is of substantially identical construction.

3. A linear electromagnetic machine of claim 1 wherein each of said plurality of coils is of identical construction.

4. A linear electromagnetic machine of claim 1 wherein each of said ring shaped permanent magnets subtends a different axial length than each of said coils.

5. A linear electromagnetic machine of claim 1 wherein the flux path for the radial components of the external magnetic field are always through the same constantly radially aligned coil and ring shaped permanent magnet.

6. A linear electromagnetic machine of claim 5 wherein said stationary assembly includes another core member formed of a ferromagnetic material positioned in axial symmetry and in radial separation inwardly of said ring shaped permanent magnets, and,
- another plurality of coils coaxially aligned with said single plurality of coils and positioned between said plurality of permanent magnets and said another core member.

7. A linear electromagnetic machine of claim 6 wherein each of said ring shaped permanent magnets subtends a shorter axial length than each of said coils.

8. A linear electromagnetic machine comprising:
- a housing having an axially reciprocable shaft centrally positioned therein along a longitudinal axis,
- an armature assembly secured to said shaft and having a plurality of fixed axial spaced ring shaped permanent magnets coaxially positioned about said longitudinal axis around said shaft, said magnets being of opposite radial polarization for producing an external magnetic field with radial components of opposite directions,
- a stationary assembly secured within said housing having at least one elongate core member formed of a ferromagnetic material coaxially positioned about and in radial separation from said plurality of ring shaped permanent magnets for providing a continuous flux path along said longitudinal axis for said magnetic field between the radial components thereof,
- at least a single plurality of axially spaced annularly wound coils coaxially positioned about said longitudinal axis in the space between said core member and said plurality of ring shaped permanent magnets, each of said coils maintaining a stationary relation with said core member and radial and axial symmetry with a particular one of said permanent magnets, said coils being serially connected to conduct current in opposite directions whereby the interaction between the electric current flowing in one of said coils when a potential is applied across said coils and the radial component of said permanent magnetic field produced by the particular one of said permanent magnets in radial and axial symmetry therewith creates cross product forces parallel to said longitudinal axis which generate a net axial force varying linearly with the amplitude of said flowing current to axially displace said armature assembly and said shaft.

9. A linear electromagnetic machine of claim 8 wherein each of said plurality of ring shaped permanent magnets is of substantially identical construction.

10. A lineaar electromagnetic machine of claim 8 wherein each of said plurality of annularly wound coils is of identical construction.

11. A linear electromagnetic machine of claim 8 wherein each of said ring shaped permanent magnets subtends a different axial length than each of said coils.

12. A linear electromagnetic machine of claim 8 wherein the flux path for the radial components of the external magnetic field are always through the same constantly radially aligned coil and ring shaped permanent magnet.

13. A linear electromagnetic machine of claim 12 wherein said stationary assembly includes another elongate core member formed of a ferromagnetic material coaxially positioned in radial separation inwardly of said ring shaped permanent magnets, and
- another plurality of coils coaxially aligned with said single plurality of coils and positioned between said plurality of permanent magnets and said another core member.

14. A linear electromagnetic machine of claim 13 wherein each of said ring shaped permanent magnets subtends s shorter axial length than each of said coils.

* * * * *